US010648497B2

(12) United States Patent
Goelst et al.

(10) Patent No.: US 10,648,497 B2
(45) Date of Patent: May 12, 2020

(54) CONNECTABLE BOX CARCASS FRAMEWORK MEMBERS

(71) Applicants: Mac Goelst, Bend, OR (US); Luke Wright, Bend, OR (US)

(72) Inventors: Mac Goelst, Bend, OR (US); Luke Wright, Bend, OR (US)

(*) Notice: Subject to any disclaimer, the term of this patent is extended or adjusted under 35 U.S.C. 154(b) by 0 days.

(21) Appl. No.: 15/628,223

(22) Filed: Jun. 20, 2017

(65) Prior Publication Data
US 2017/0370391 A1 Dec. 28, 2017

Related U.S. Application Data

(60) Provisional application No. 62/354,647, filed on Jun. 24, 2016.

(51) Int. Cl.
| | |
|---|---|
| *F16B 12/02* | (2006.01) |
| *F16B 5/00* | (2006.01) |
| *F16B 5/02* | (2006.01) |
| *F16B 5/06* | (2006.01) |
| *A47B 47/00* | (2006.01) |
| *A47B 47/02* | (2006.01) |
| *F16B 12/44* | (2006.01) |

(Continued)

(52) U.S. Cl.
CPC .......... *F16B 12/02* (2013.01); *A47B 47/0083* (2013.01); *A47B 47/02* (2013.01); *F16B 5/0036* (2013.01); *F16B 5/0044* (2013.01); *F16B 5/0052* (2013.01); *F16B 5/0614* (2013.01); *A47B 87/008* (2013.01); *F16B 5/02* (2013.01); *F16B 12/30* (2013.01); *F16B 12/36* (2013.01); *F16B 12/50* (2013.01); *F16B 2001/0092* (2013.01); *F16B 2012/446* (2013.01)

(58) Field of Classification Search
CPC ........ F16B 12/02; F16B 5/004; F16B 5/0052; F16B 5/02; F16B 5/0044; F16B 5/0614; F16B 5/0036; F16B 2012/446; F16B 2001/0092; F16B 12/36; F16B 12/30; F16B 12/50; A47B 47/0025; A47B 47/005; A47B 47/02; A47B 47/03; A47B 47/0083; A47B 87/008; H05K 7/18; H05K 7/183; H05K 5/0217; H02B 1/013
USPC .................. 312/265.1, 265.2, 265.4; 211/26
See application file for complete search history.

(56) References Cited

U.S. PATENT DOCUMENTS 3,798,863 A * 3/1974 Latson .................... E04B 2/766
52/204.597
4,403,817 A * 9/1983 Aidar ................. A47B 88/9416
312/265.1

(Continued)

FOREIGN PATENT DOCUMENTS

WO WO-9414307 A1 * 6/1994

*Primary Examiner* — Theodore V Adamos
(74) *Attorney, Agent, or Firm* — Mark S Hubert

(57) ABSTRACT

A pair of connectable box carcass framework members for the fabrication of non-panel constructed furniture carcasses. They simplify the construction of a furniture carcass with a minimal of tools and skill required to produce a dimensionally square, precisely sized, box that accepts an abundance of aesthetic and functional options. They are based on a pair of mechanical fastener connectable vertical and horizontal members that have connectable zipper channels, linear rabbets for the retention of side panels, screw busses, and open channels with series of spaced orifices therein for the passage of mechanical connectors.

12 Claims, 15 Drawing Sheets

(51) Int. Cl.
*F16B 1/00* (2006.01)
*F16B 12/36* (2006.01)
*A47B 87/00* (2006.01)
*F16B 12/50* (2006.01)
*F16B 12/30* (2006.01)

(56) References Cited

U.S. PATENT DOCUMENTS

| | | | | |
|---|---|---|---|---|
| 4,463,057 A * | 7/1984 | Knurr | | A47B 96/1466 191/22 DM |
| 4,669,616 A * | 6/1987 | Mazura | | H05K 7/183 211/41.17 |
| 4,958,259 A * | 9/1990 | Berg | | H05K 7/183 312/265.2 |
| 5,046,791 A * | 9/1991 | Kooiman | | A47B 47/0025 312/265.1 |
| 5,513,759 A * | 5/1996 | Besserer | | F16M 1/00 211/189 |
| 5,516,225 A * | 5/1996 | Kvols | | A47B 47/0008 312/265.1 |
| 5,584,406 A * | 12/1996 | Besserer | | F16M 1/00 211/189 |
| 5,590,939 A * | 1/1997 | Piontek | | A47B 13/06 312/263 |
| 5,695,263 A * | 12/1997 | Simon | | H05K 7/183 312/265.1 |
| 5,873,480 A * | 2/1999 | Wells, Jr. | | H05K 7/183 220/4.02 |
| 5,899,545 A * | 5/1999 | Besserer | | H02B 1/38 211/26 |
| 6,027,192 A * | 2/2000 | Irace | | A47B 47/02 312/205 |
| 6,039,420 A * | 3/2000 | Besserer | | A47B 47/02 211/189 |
| 6,152,553 A * | 11/2000 | Wunderlich | | A47B 47/0091 108/110 |
| 6,217,139 B1 * | 4/2001 | Henriott | | A47B 21/06 312/219 |
| 6,592,194 B2 * | 7/2003 | Lininger | | A47B 83/001 312/257.1 |
| 7,316,459 B2 * | 1/2008 | Tenbrink | | A47B 45/00 312/114 |
| 7,874,106 B2 * | 1/2011 | Pangburn | | E06B 1/68 29/464 |
| D647,634 S * | 10/2011 | Pensi | | F16M 1/00 D25/124 |
| 9,198,324 B1 * | 11/2015 | Yousif | | H05K 7/18 |
| 2011/0012489 A1 * | 1/2011 | Shen | | A47B 96/14 312/326 |
| 2011/0050052 A1 * | 3/2011 | Elkins | | H05K 7/186 312/223.1 |
| 2012/0206876 A1 * | 8/2012 | Chen | | H05K 5/0021 361/679.58 |
| 2013/0034383 A1 * | 2/2013 | Chong | | E04B 1/24 403/231 |
| 2013/0320829 A1 * | 12/2013 | Dries | | F16B 12/02 312/237 |
| 2015/0136714 A1 * | 5/2015 | Franklin | | H05K 7/1495 211/26 |
| 2016/0073547 A1 * | 3/2016 | Maloney | | H05K 7/02 211/26 |

* cited by examiner

CONNECTABLE BOX CARCASS FRAMEWORK MEMBERS

PRIORITY

This patent incorporates by reference herein and claims priority to U.S. Provisional Patent Application No. 62/354,647 entitled "Cabinet System with Extruded Aluminum Multi-Purpose Components" filed Jun. 24, 2016.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to furniture fabrication, and more particularly to a simplistic method of box construction based around a pair of connectable linear members.

BACKGROUND

Boxes are the common element in cabinets, carts, cases and the like. It is the final elements attached to the basic box that defines what it is. The final purpose of the box dictates the dimensions, strength, material of the outer faces, and what functional accessories will be attached.

Traditional methods of construction generally use steel or wood panel assembly, are time consuming to complete, involve the use of numerous precision tools, and most importantly, require an enhanced degree of proficiency with all of the tools and attendant joinery techniques. This results in two major downfalls. Quality cabinetry fabrication is out of the realm of the average person, and the price of quality cabinets is outrageously high.

Henceforth, an improved pair of connectable linear carcass framework members that enable precision furniture and cart fabrication with a minimum of cabinetmaking expertise and equipment, would fulfill a long felt need in the furniture industry. This new invention utilizes and combines known and new technologies in a unique and novel configuration to overcome the aforementioned problems and accomplish this.

BRIEF SUMMARY

In accordance with various embodiments, a system of two connectable linear carcass framework members that are dimensionally stable (creepless), and can be accurately cut for precise dimensioned carcass fabrication is provided.

In one aspect, a pair of aluminum, connectable linear members that allow the fabrication of the framework for a carcass that can be fitted for finish with any commercial furniture fittings including but not limited to doors, handles, push bars, drawers, shelves, and lights is provided.

In another aspect, a pair of aluminum, connectable linear members that allow the fabrication of a carcass by the spaced connection of industry standard dimensioned inner and outer planar panels, available in numerous materials so as to allow customized aesthetic appearances is provided.

In another aspect, a pair of connectable linear members that have internal voids to accommodate wiring for the construction of specialty boxes is provided.

In yet another aspect, a pair of aluminum, connectable linear members that may be precisely dimensioned for assembly with a minimal of low cost, low tech equipment by one with only rudimentary cabinetmaking skills working in a spatially constrained workshop is provided.

In yet another aspect, a pair of aluminum, connectable linear members having dimensions and an extruded strengthened configuration such that the resultant assembled carcass will have a high strength to weight ratio and resist any deformation from its normal (90 degree) side, back bottom and top wall configurations.

In a final aspect, a method of cabinetmaking that allows for the construction of an extremely versatile, strong, rigid box (even in the field) conforming to a high degree of dimensional tolerances and that can be aesthetically surface finished with wood, polymer, glass, steel or metal, with a minimal of tools, skill and space, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
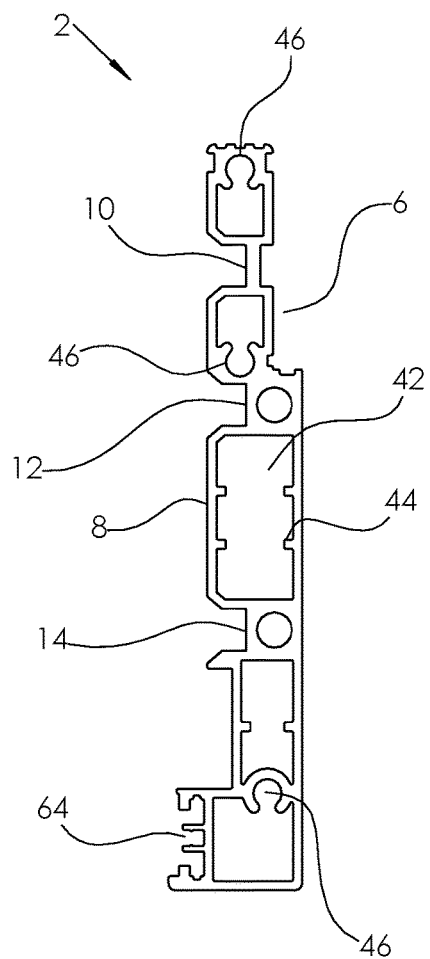
FIG. 1 is an end view of a first vertical member.

While various aspects and features of certain embodiments have been summarized above, the following detailed descriptions illustrate at least one exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. The present invention is a system for configurable box construction, defined for their final purpose by their exterior and interior face finishes and their installed hardware accessories. No single feature or features of any described embodiment should be considered essential to every embodiment of the invention, as other embodiments of the invention may omit such features.

In this description, the directional prepositions of vertical, horizontal, up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "carcass" refers to the unfinished framework or skeleton of a three dimensional box. The finished product of the box may be a cabinet, a cart, a drawer, a case, a display or any of a plethora of other furniture pieces.

As used herein the term "cabinet" refers to any of the various finished items of furniture that the box carcass can be finished into, such as rolling carts, display boxes, drawers, cases, cabinets and the like.

As used herein, the term "screw buss" refers to linear recess with continuous or interrupted side wall/s, adapted for the frictional retention of a mechanical fastener against its inner wall/s.

The present invention relates to a novel design for non-panel constructed furniture carcasses. It uses connectable box carcass framework members that simplify the construction of a furniture carcass in that there are minimal tools and skill required to produce a strong, dimensionally square, precisely sized, box that has a configuration that accepts an abundance of aesthetic and functional options, (by virtue of its orifice geometry and spacing) that are commercially available from a host of third party vendors. It is based on a pair of connectable structural vertical and horizontal members and alternate embodiments thereof. Essentially, any practical dimension of a cabinet can be fabricated using these members since these vertical and horizontal members are manufactured in stock cutable lengths that exceed nominal cabinet dimensions. The assembly of these vertical and horizontal structural members is strong enough that the assembled cabinet need not structurally to have a front or rear panel to retain its "squareness".

Prior art cabinet construction systems utilize side panels to form the structure of the cabinet box and also to provide the orifice patterns for shelves, doors and drawer slides. Corner braces are the norm in prior art cabinetry construction. The present design uses connectable vertical and horizontal linear members to form the front and rear frames for the box carcass framework. Side panels serve only to dimension (add depth) the cabinet and connect the front and rear assembled frames. Side panels have no penetrations, rather are just dimensioned sections of planar sheet material. The linear members have three patterned series of orifices sized and spaced so as to accommodate shelves, doors and drawer slides as well as mechanical fastening members for construction of the frames. This style of cabinet construction is novel in the field.

Figure 2:
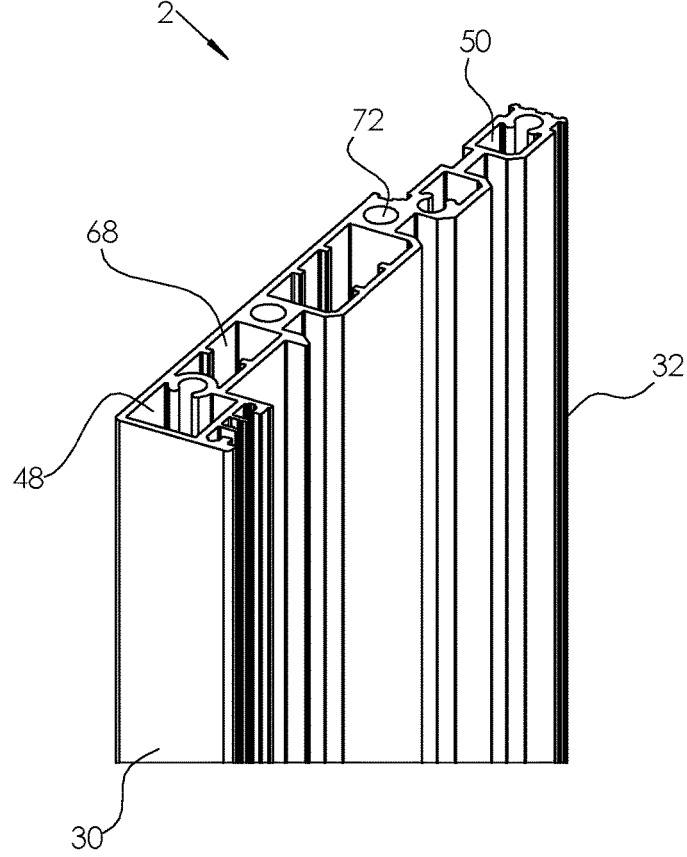
FIG. 2 is a perspective side view of a first vertical member.
Figure 3:
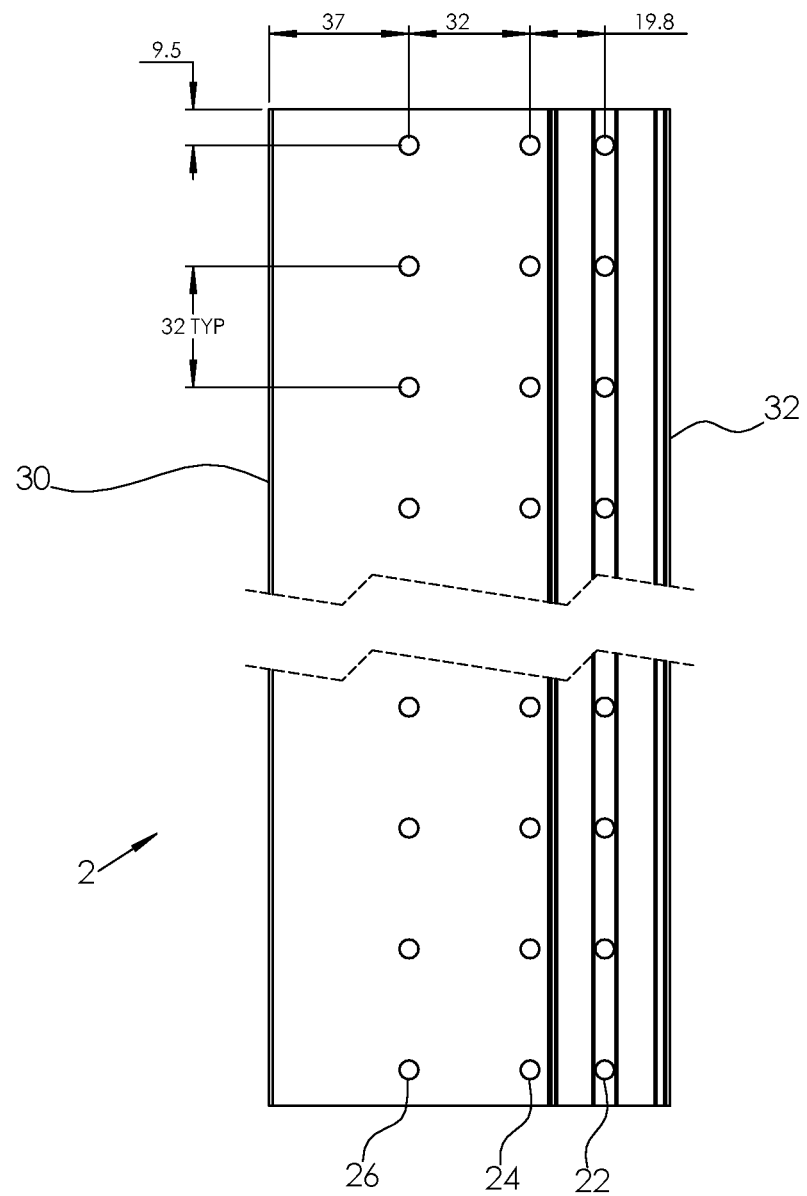
FIG. 3 is a side view of the inner face of a vertical member.

Looking at FIGS. 1, 2 and 3 the first vertical member (front vertical member) 2 can best be seen, The first vertical member 2 is an extruded aluminum linear member having a series of different parallel profiles and configurations formed thereon its inner side 4 and its exterior side 8, running along its linear axis. It has a distal end 30 and a proximal end 32 cut perpendicular to its linear axis. The inner side 4 is generally planar with a rabbet 6 formed along one entire running parallel to the linear axis of the vertical member 2. The rabbet 6 is for the attachment of a structural inner panel, and has depth of approximately ¼ inch which is a dimension that substrate goods in wood, metal, polymers can be readily found in. The exterior side 8 has first, second and third beveled exterior open channels 10, 12 and 14 running the entire length of the first vertical member 2 and lying parallel to each other and the linear axis of the first vertical member 2. These exterior open channels 10, 12 and 14 have an outer, top beveled edge 16 so as to accommodate the beveled head of a screw or equivalent mechanical fastener 100 such that it resides even with or slightly below the top of the exterior side 8 when operatively connected between the first vertical member 2 and the horizontal member 20 when assembled to make a front frame.

Figure 10:
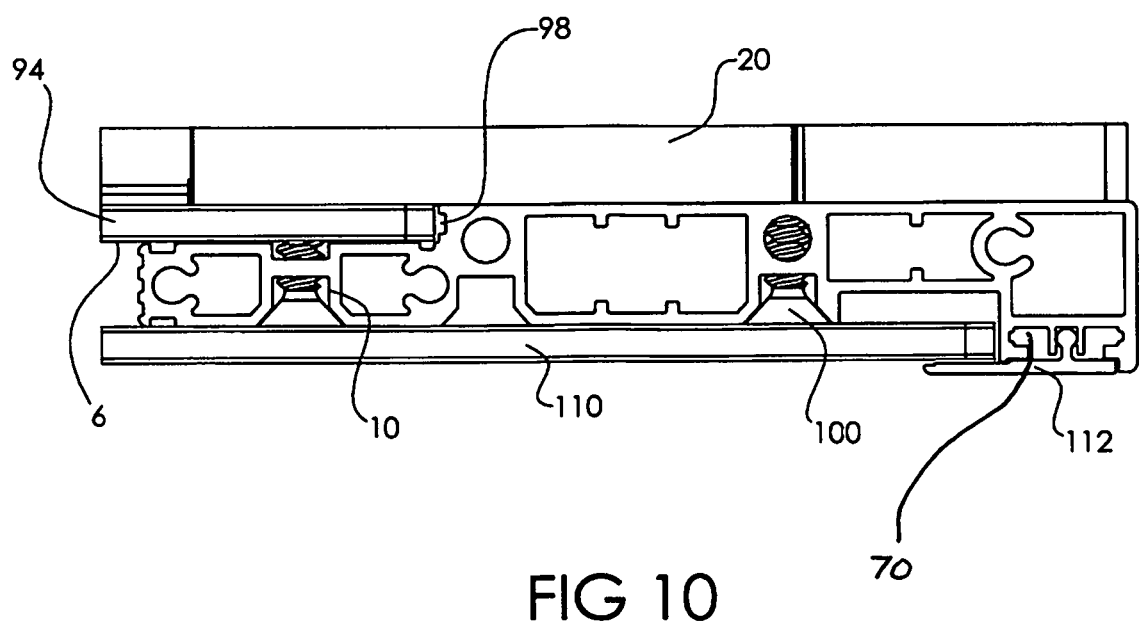
FIG. 10 is a top view of an assembled frame left corner with snap cover.

There is a first zipper channel 64 formed on the exterior face 8 adjacent the distal end 30 of the first vertical member 2. The zipper channel 64 can best be seen in FIGS. 10 and 11. This zipper channel 64 has a significant role in the finished aesthetics of the cabinet as well as the ability to configure it for its final purpose. The zipper channel 64 has two mirror image, "L" shaped dados 70 formed therein and separated by a centrally positioned "U" shaped dado 71 there between. These two different styles of dados accommodate different trim pieces. The walls of the dados are tapered inward, narrowing from the top to the bottom of the dados. This physical configuration allows for the sliding engagement and interlocking of a host of matingly conformed structural and aesthetic linear members as will be discussed further herein. It is important to note that the first zipper channel 64 extends above the plane of the remainder of the exterior side by ¼ inch. This allows the flush attachment of a ¼ inch thick exterior aesthetic panel, to be discussed herein.

The first, second and third beveled channels, 12 and 14 are not spaced equidistant from each other. There are first, second and third linear series of orifices 22 24 and 26 that lie along the centerline of their respective beveled channels 10, 12 and 14. The orifices in each linear series are equally spaced from all of the adjacent orifices within their series. These orifices suit two purposes. First, they are construction orifices for the structural connection of various elements (such as inner structural panels) via the appropriate mechanical fasteners. Second, they are system attachment orifices for the attachment of commonly available cabinet components such as shelves, doors and the like. For this reason, these series of orifices are sized and spaced in conformance with the industry standard dimensions for cabinet componentry.

Approximately centered in, and lying parallel to the linear axis along the first vertical member 2 is a central linear void 42 that that serves to stiffen the front vertical member 2 and provide a wiring chase. It has four linear strengthening ribs 44 formed there along its entire inner face. There are no orifices into this central channel 44 so that there will not be the inadvertent intrusion of a mechanical fastener that could cause electrical issues.

There are a total of seven linear voids in between the distal and proximal ends 30 and 32 and the inner and exterior sides 4 and 8. Three of these voids have walls that form "C" shaped screw busses 46 that provide a structural component for the retention of the threaded end of a mechanical fastener, thus allowing countertops, lids, bottom plates and the like to be mechanically attached to the cabinet to form a top and bottom face. One of these screw busses 46 is formed in the distal end void 48 adjacent the distal end 30 and one of these screw busses 46 is formed in the proximal end void 50 adjacent the proximal end 32 of the first vertical member 2. The remaining screw buss is formed on the wall of a void located there between the distal end void 48 and the proximal end void 50. There is a rectangular void with two stiffening ribs formed thereon that abuts the distal end void 48. The remaining two voids are cylindrical voids 72 that may be used as additional screw busses.

It is to be noted that the "C" shaped screw busses extend the entire length of the vertical member and have an open slot formed therealong.

Looking at FIG. 3 the preferred dimensions of the first second and third linear series of orifices 22, 24 and 26 can best be explained. These do not differ between the first vertical member 2 and the second vertical member 40. Each linear series of orifices has its highest orifice (a construction orifice) located at 9.5 mm from the top end of the vertical member. Each linear series of orifices has its lowest orifice (a construction orifice) centered at 9.5 mm from the bottom end of the vertical member. This spacing is used as it is it is half of the industry's standard top structural panel thickness of 19 mm. Thus, the 9.5 mm centers mechanical fasteners therein the panel and also positions the top of the structural panel flush with the top of the vertical member.

All subsequent orifices in each linear series are system attachment orifices and are 32 mm apart, center-to-center. The third linear series of orifices 26 is vertically centered at 37 mm from the distal end 30 of the vertical member. The second linear series of orifices 24 is vertically centered 32 mm from the vertical center of the third linear series of orifices 26 (or 69 mm from the distal end of the vertical member). The first linear series of orifices 22 is vertically centered 19.8 mm mm from the vertical center of the second linear series of orifices 24 (or 88.8 mm from the distal end of the vertical member).

It is to be noted that construction orifices and system attachment orifices differ only in their spacing from the distal and proximal ends of the vertical members. The vertical members may be cut perpendicular to their linear axis between any adjacent orifices so as to create the proper construction orifice spacing of 9.5 mm from the distal and proximal edges of the vertical member to the center of the orifice.

It is also to be noted that while the preferred embodiment orifice spacing dimensions are based around the most prevalent industry system dimensions, there are other systems with different dimensions that the vertical members could be dimensioned to.

Figure 4:
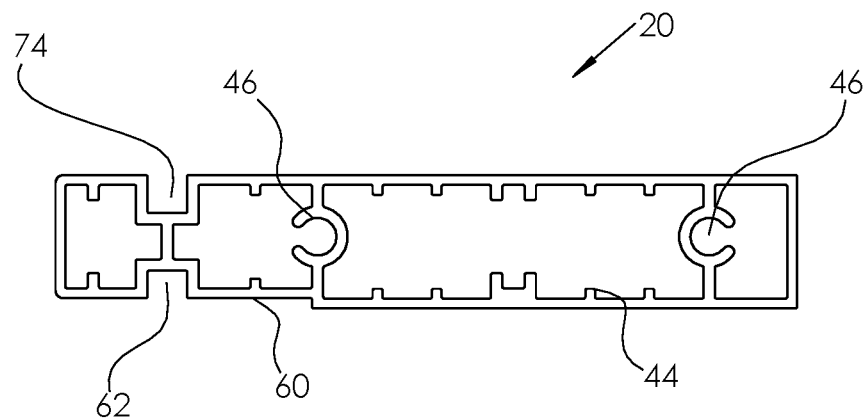
FIG. 4 is an end view of a horizontal member.
Figure 5:
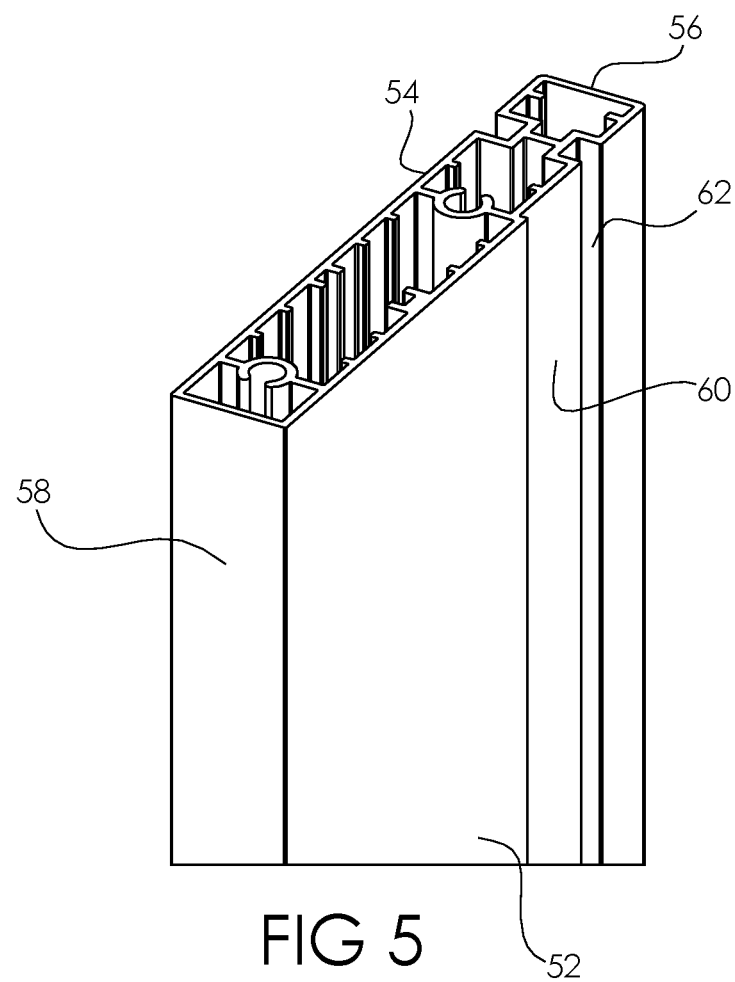
FIG. 5 is a perspective side view of a horizontal member.

The horizontal member 20 is an aluminum linear extrusion having an exterior face 54, and interior face 52 a distal end 56 and a proximal end 58 as can be seen in FIGS. 4 and 5. The proximal and distal ends are cut perpendicular to the linear axis. It is symmetrical about its centerline when viewed in an axial cross section. Its proximal end 56 has a rabbet 60 formed there along running parallel to the linear axis of the horizontal member. The rabbet has depth of approximately ¼ inch which is a dimension that substrate goods in wood, metal, polymers can be readily found in. It has four linear voids formed therein. The largest linear void has eight stiffening ribs 44 formed thereon its inner side walls and two "C" shaped screw busses 46 (similar to those found in the first vertical member 2) formed on its end walls. This void serves to stiffen the horizontal member 20 and to serve as a horizontal wire chase. The screw busses 46 are spaced so as to align with orifices from the first and third linear series of orifices 22 and 26. Along the exterior face 52 adjacent the proximal end 56 is formed a rabbet 60, having a depth of ¼ inch, to accommodate commercially available planar substrates. There is also an exterior dado 62 formed along the length of the rabbet 60. There is an interior dado 74 formed along the interior face 52 running parallel to the exterior dado 62.

Figure 17:
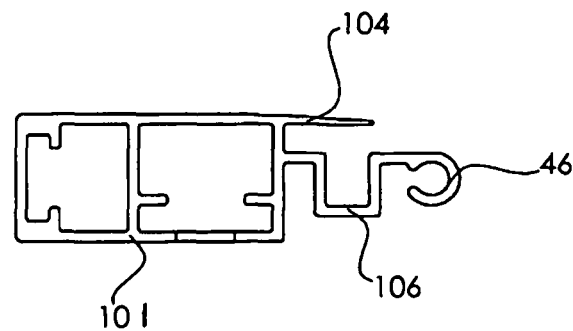
FIG. 17 is an assembly front view of a cart cabinet.

Each cabinet requires a front frame 80 and a rear frame 82 (See FIGS. 17 and 19) These frames are denoted by their location in the cabinet. These frames may be identical or different structurally, based on the type of vertical members used to make the frame. (A second vertical member 40 is discussed further herein.) Each frame is constructed of two identical first vertical members 2 and two identical horizontal members 20, The horizontal members 20 are positioned perpendicularly between the first vertical members, one horizontal member 20 spanning between the distal ends 32 of the two first vertical members 2 and one horizontal member 20 spanning between the proximal ends 30 of the two first vertical members 2. The screw busses 46 of the horizontal members 29 are aligned with orifices from the first and third linear series of orifices 22 and 26 in the vertical members 2. Tapered head screws are passed through the orifices from the first and third linear series of orifices 22 and 26 from the first and third beveled channels 10 and 14. The tapered screws are used to threadingly engage the screw busses 46, drawing the straight distal ends 56 and proximal ends 58 ends of the horizontal members 20 into firm contact with the internal face 4 of the first vertical member 2 so as to make two front frames 80 that are a solid rectangle. The frames are directly connected to each other as described above without any intermediary structural elements as described above and illustrated in FIGS. 8 and 9.

Figure 8:
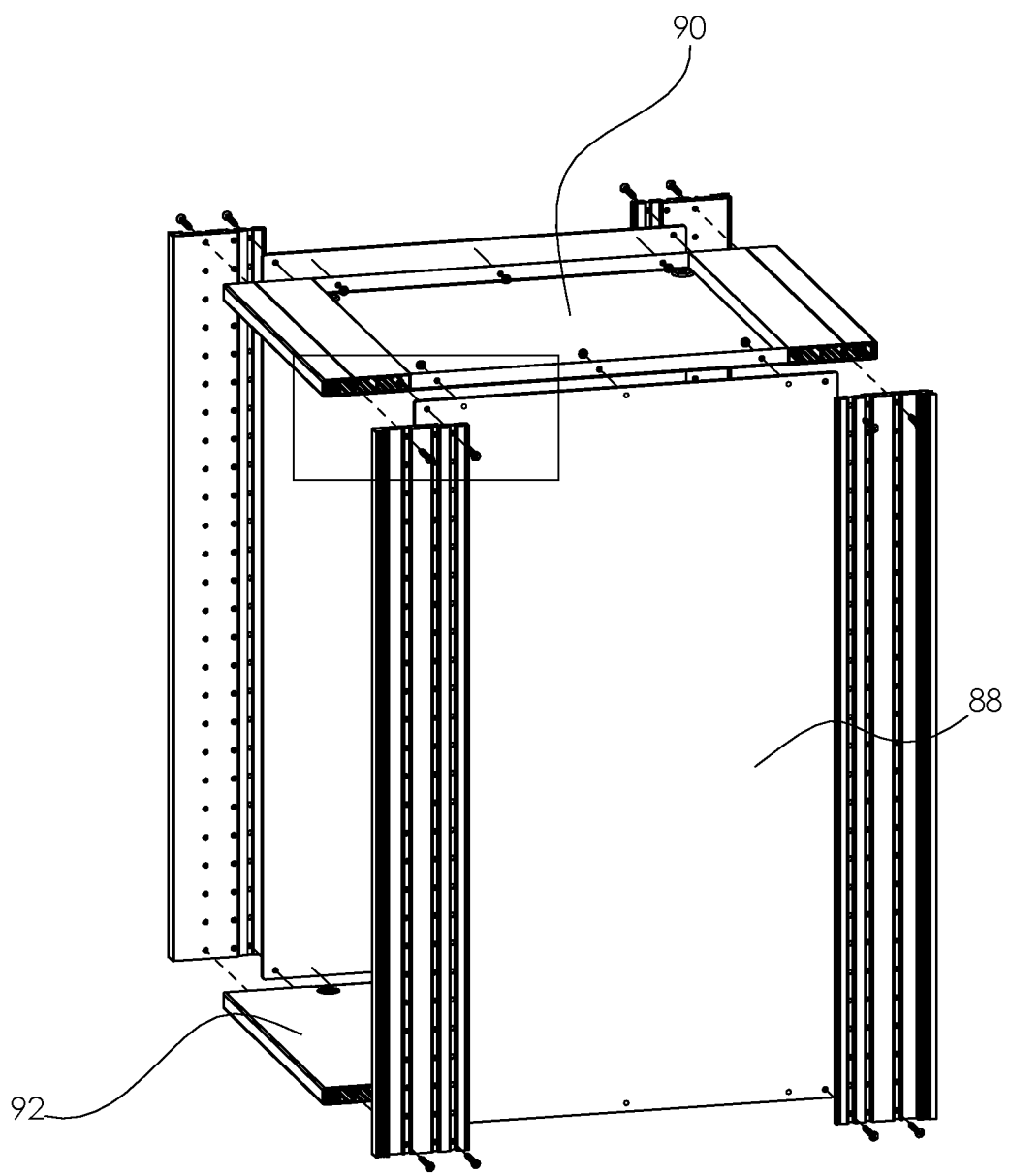
FIG. 8 is a perspective view of an assembled carcass.

With the front and rear frames assembled, looking at FIG. 8 it can be seen that the construction of the most simple carcass requires two identical frames installed in mirror image configurations such that their proximal ends face each other. Each frame is made of two first vertical members 2 and two horizontal members 20. Here there is no need for a back panel to the cabinet. However, there is a need for at least two side structural 88 panels or at least a top panel 90 and bottom panel 92 to connect the two frames 80 and 82 and give the carcass depth.

Figure 9:
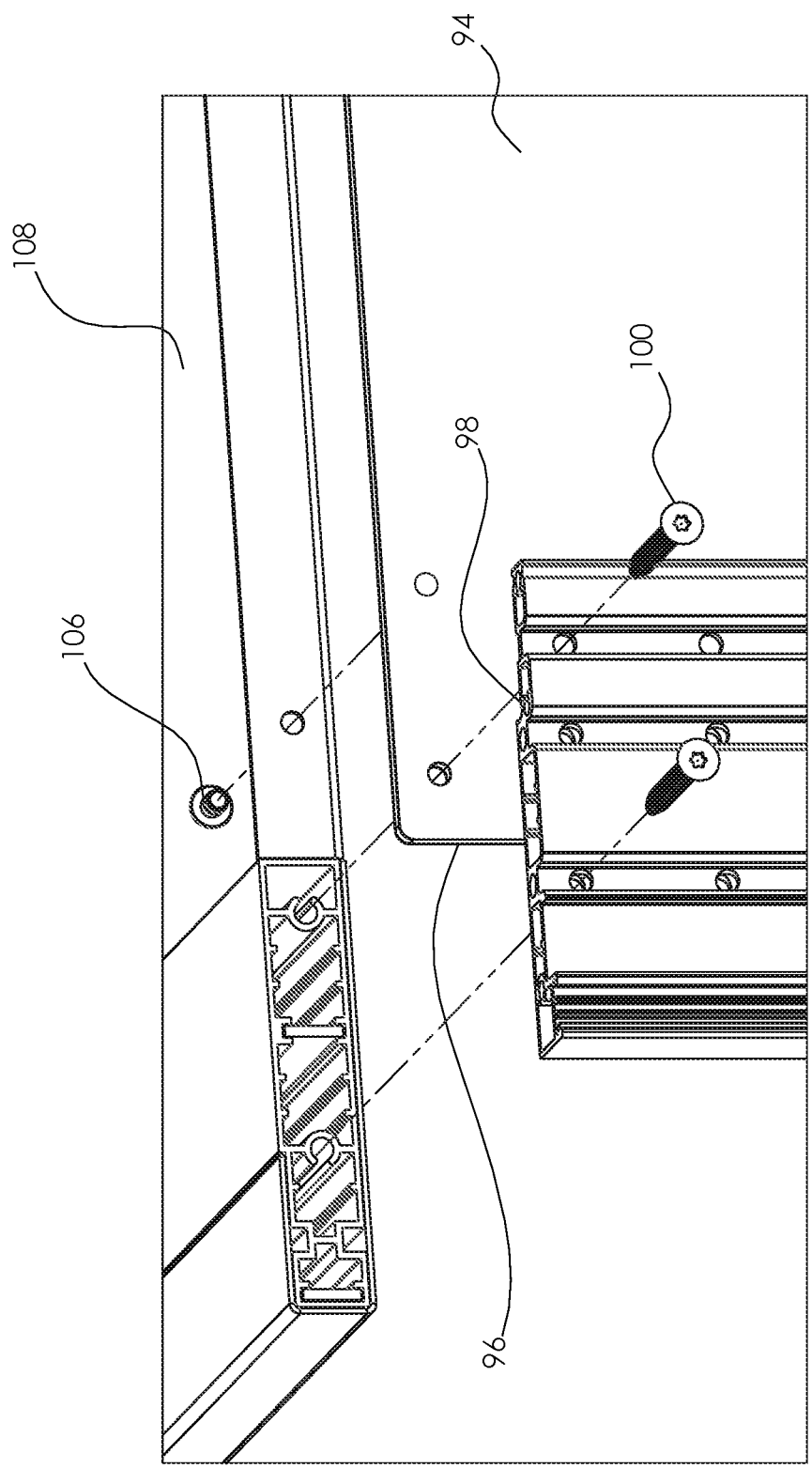
FIG. 9 is an assembly view of front frame corner D of FIG. 8.

In construction of a cabinet, as shown in FIG. 9, it can be seen that prior to the assembly of the first vertical member 2 and the horizontal member 20 a panel 94 a ¼ inch thick is cut for the height and depth dimensions of the cabinet. The frames are positioned such that they are in opposition to each other or are mirror images of each other about a vertical plane passing through the center of the cabinet. The panel 94 is aligned with part of its interior face lying in contact with each of the rabbets 6 on the first vertical members 2 and each of its vertical edges 96 contacting the lip 98 on inner edge of the rabbets on the first vertical members 2. This panel 94 is an inner structural panel as it is used to dimension the depth of the cabinet and stabilize the front and rear frames into the carcass of the cabinet. At each of the four corners, there is a first mechanical 100 passing through the first exterior open channel 10, through the top orifice in the first linear series of orifices 22, through an orifice in the panel 94 and then threadingly engaged into the screw buss 46 formed on the end walls of the largest linear void in horizontal member 20. There is a second mechanical fastener 100 passing through the third exterior open channel 14 and through the top orifice in the third linear series of orifices 26 then threadingly engaged into the other of the two screw busses 46 formed on the end walls of the largest linear void in horizontal member 20. (See FIG. 10) (There is the option of adding pop rivets 106 to the panel 94 if an optional top pan 108 is used in the cabinet construction.)

In this design, the panel 94 uses its edge contact with the rabbet lips as well as its frictional engagement between the first vertical member 2 and the horizontal panel 20 to hold the front frame 80 and the rear frame 82 into a spaced, square configuration defining the volume of the carcass. This along with the generous width of the vertical and horizontal members 2 and 20 imparts high rigidity to the entire carcass maintaining its "squareness".

Figure 6:
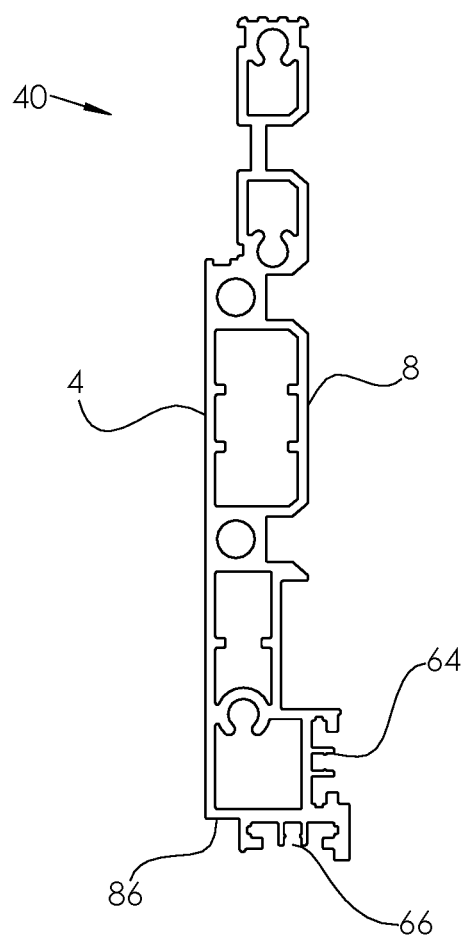
FIG. 6 is an end view of a second vertical member.
Figure 7:
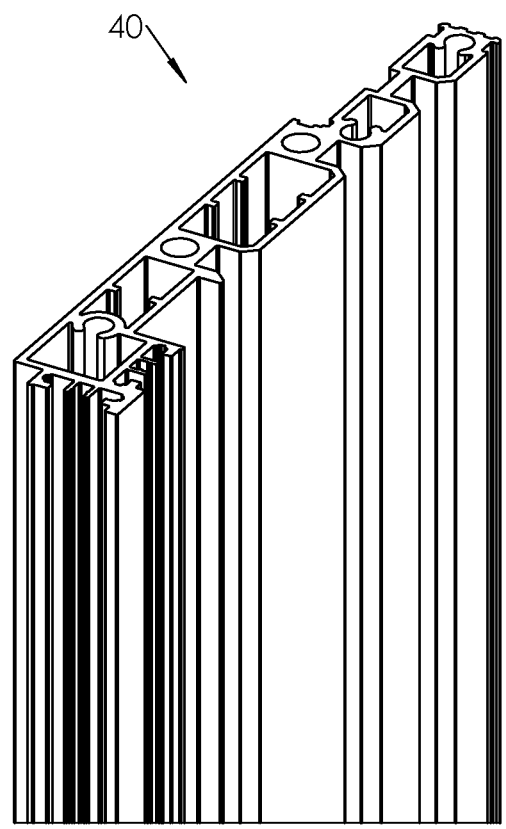
FIG. 7 is a perspective side view of a second vertical member.

With the structural inner panel 94 attached an outer aesthetic panel may be be attached. Again this panel is of a ¼ inch laminate be it wood, steel, polymer or any of a plethora of available planar materials. Here, a panel is cut to a width measured between the edges of the first zipper channels 64 on the first vertical members 2, which face each other with the opposing placement of the front and rear frames. The outer panel 110 is placed with its vertical edges in abutment with the edges of the first zipper channels 64 and a snap cover 112 is slidingly engaged along the length of each of the first zipper channels 64. The snap cover 112 has an inner face that is matingly conformed to be received in the three dados in the first zipper channels 64, and an edge that extends beyond the inner edge of the first zipper channel 64 so as to constrain the outer panel 110 firmly against the outer face of the first vertical members 2.

Where a cabinet back is needed then there must be a rear frame that is different than the front frame. The difference between these in this situation is that the rear frame uses a second (rear) vertical member 40 as illustrated in FIGS. 6 and 7. The second vertical member 40 is identical to the front vertical member 2 except that it has a second zipper channel 66 formed along its distal end that resides perpendicular to and between its inner and outer faces 4 and 8 and the first zipper channel 64. This second zipper channel 66 extends approximately ¼ inch beyond the proximal end 86 of the second vertical member 40. The second and first zipper channels are structurally and functionally equivalent, and have overlapping corners residing 90 degrees apart.

The functionality of the zipper channels 64 and 66 is identical regardless whether located along the exterior face of a vertical member adjacent its distal end (as on the first and second vertical members 2 and 40), or as located on the distal end of the second vertical member 40. They serve to allow the customizing of the cabinet by the insertion of various different matingly engageable strips that are slideably or poundingly connected there along the zipper channel. Each of these matingly engageable strips have different configurations beyond their commonality of a bulbous protrusion 99 extending normally from one of their faces. It is these bulbous protrusions 99 that are frictionally forced into the center channel of the zipper channel for retention.

Figure 11:
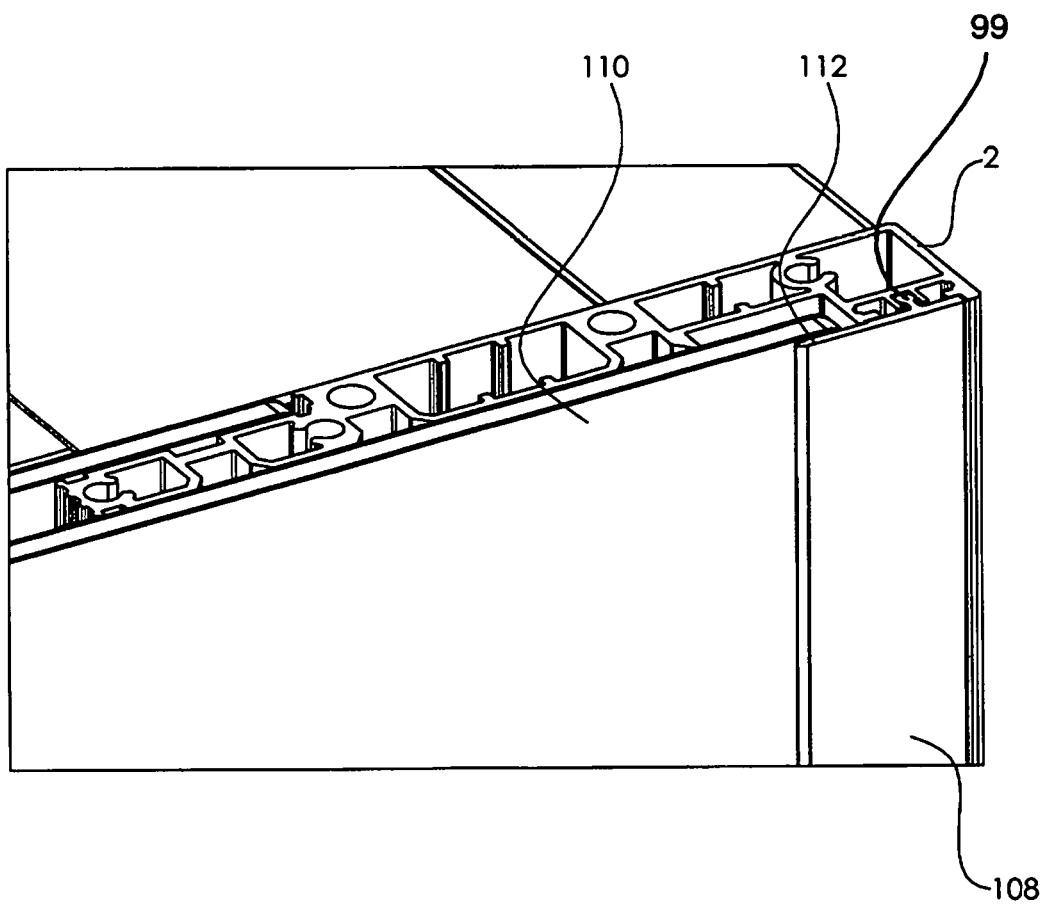
FIG. 11 is a perspective side view of an assembled frame left corner with snap cover.

Looking at FIG. 11 a trim strip 108 can be seen engaged within a first vertical member 2 so as to allow the retention of an exterior, aesthetic panel 110 onto the outside of the cabinet. The trim strip has a panel lip 112 that extends normally from it so as to constrain the edge of a panel along its vertical linear edges. As in all dimensioning of the system components, when the trim strip 108 is engaged with either of the zipper channels, (by insertion of the bulbous protrusion 99 into the centrally located U shaped dado 71) the panel lip 112 resides approximately ¼ inch above the exterior face of the linear member 2 for compatibility of ¼ inch thick planar substrates.

Figure 12:
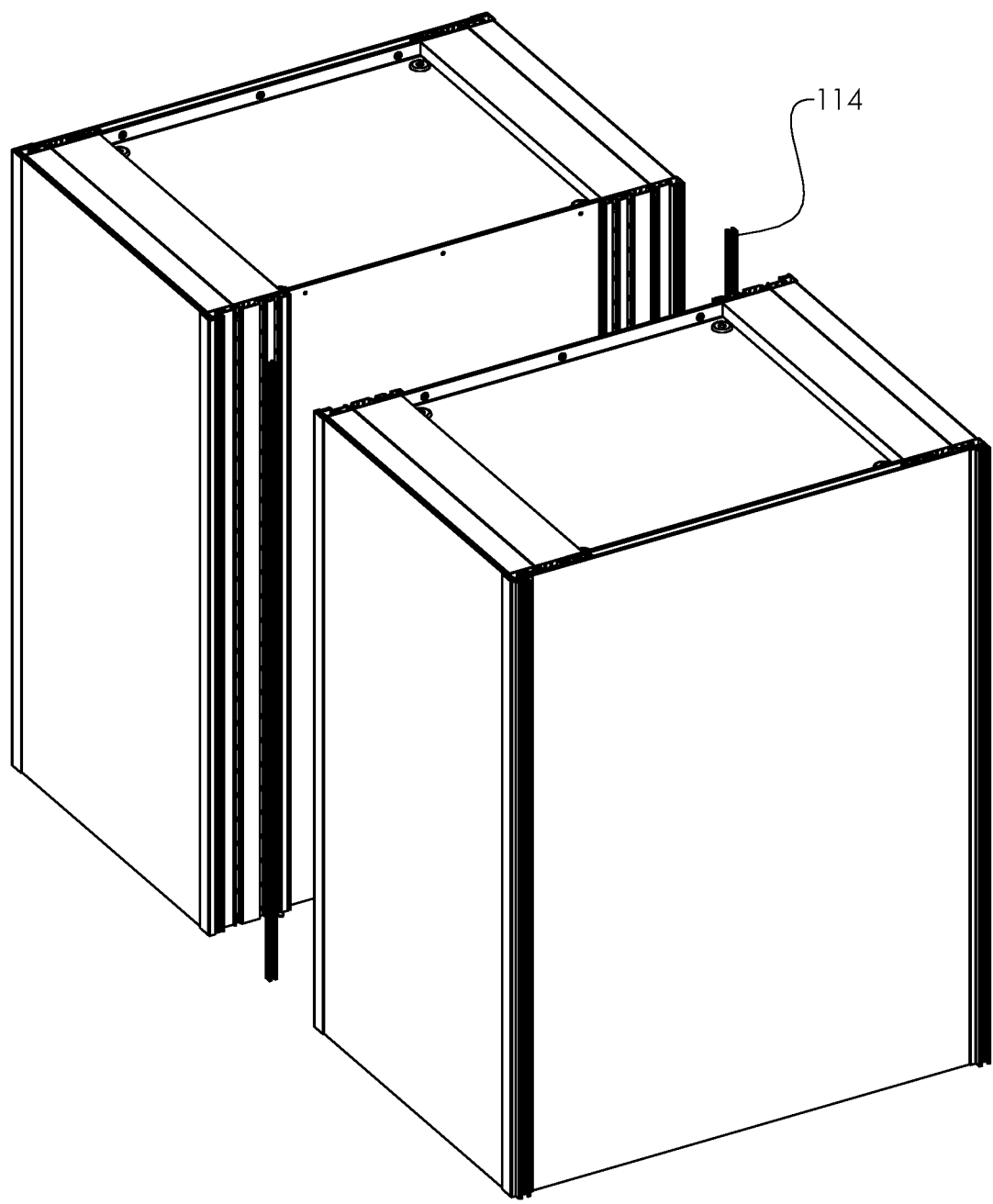
FIG. 12 is a perspective view of two assembled carcasses being joined side to side.
Figure 13:
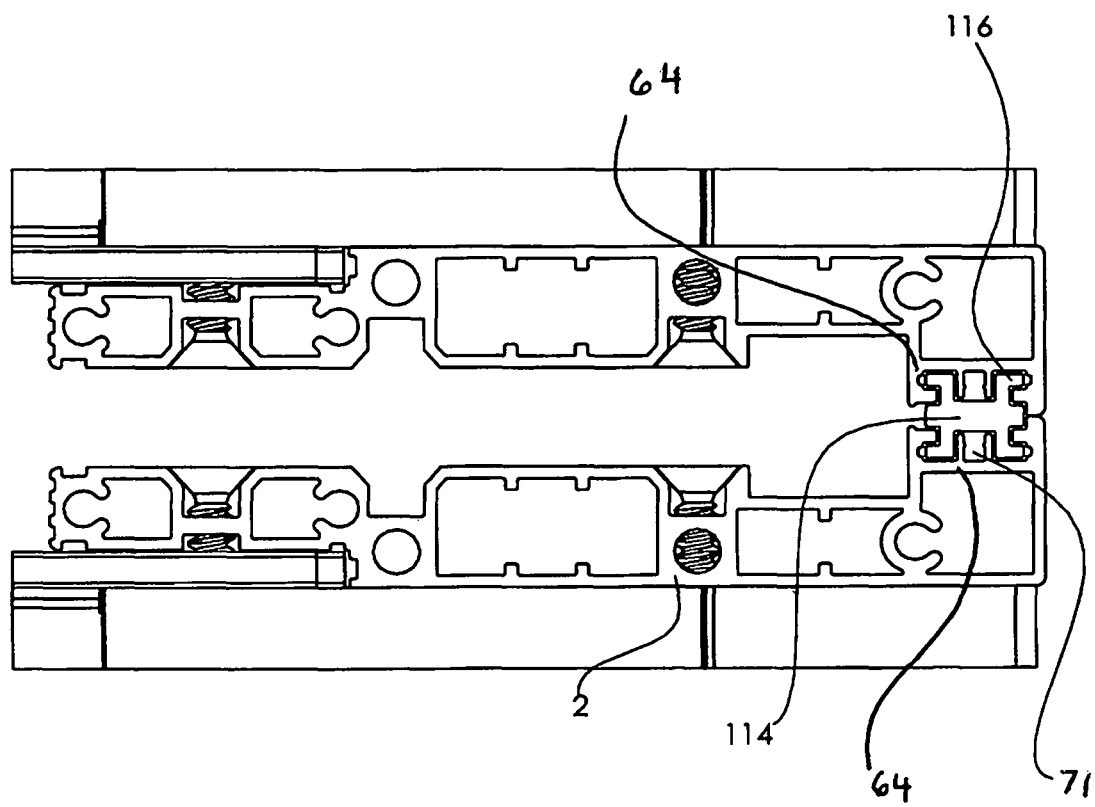
FIG. 13 is a top view of one of the joined corners of FIG. 12.
Figure 14:
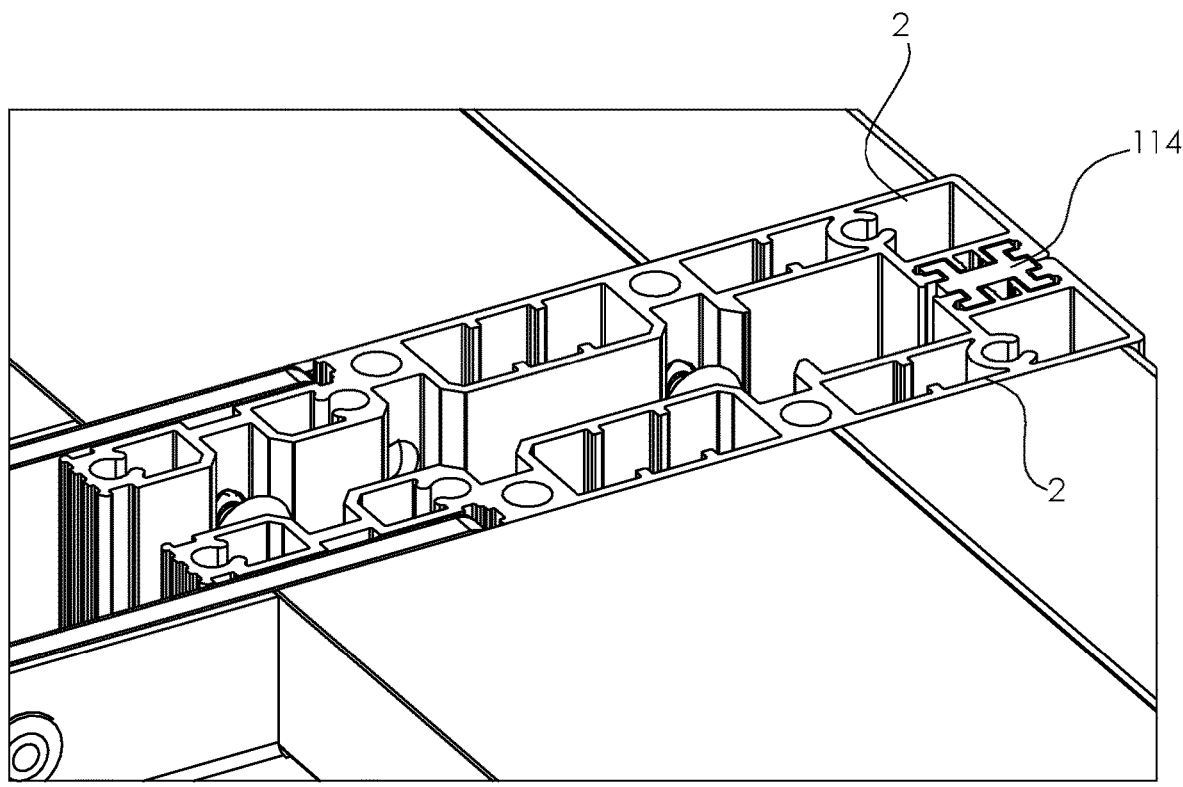
FIG. 14 is a perspective side view of one of the corners of FIG. 12.

Looking at FIGS. 13 and 14 a mullion strip 114 with four "L" shaped legs 116 can be seen engaged in the first zipper channels 64 of two first vertical members 2 on two cabinets to be joined side by side. It is to be noted that in this configuration the use of an exterior panel is optional. Since the second vertical member 40 has the additional second zipper channel 66, cabinets can be joined side to side (see FIG. 12) or back to back or back to side.

Figure 15:
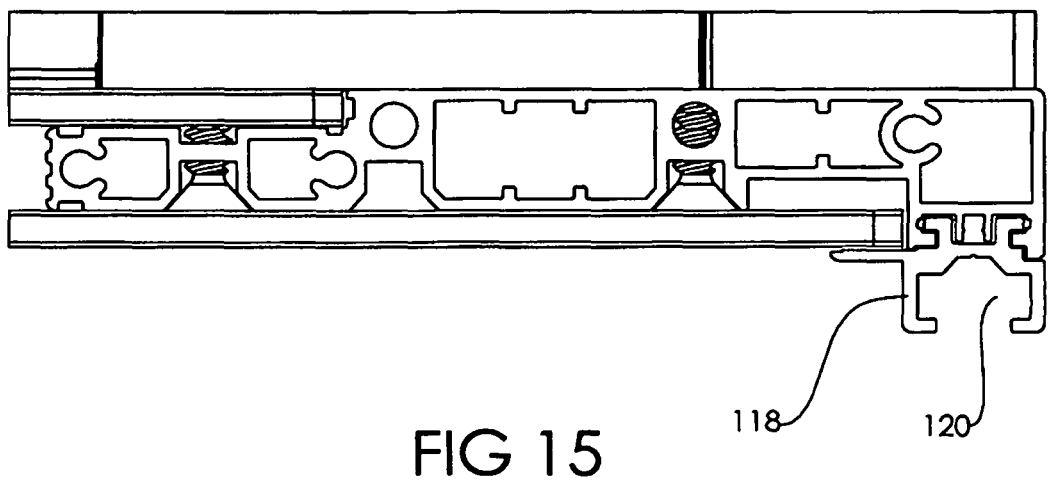
FIG. 15 is a top view of a carcass corner with a hanger channel.
Figure 16:
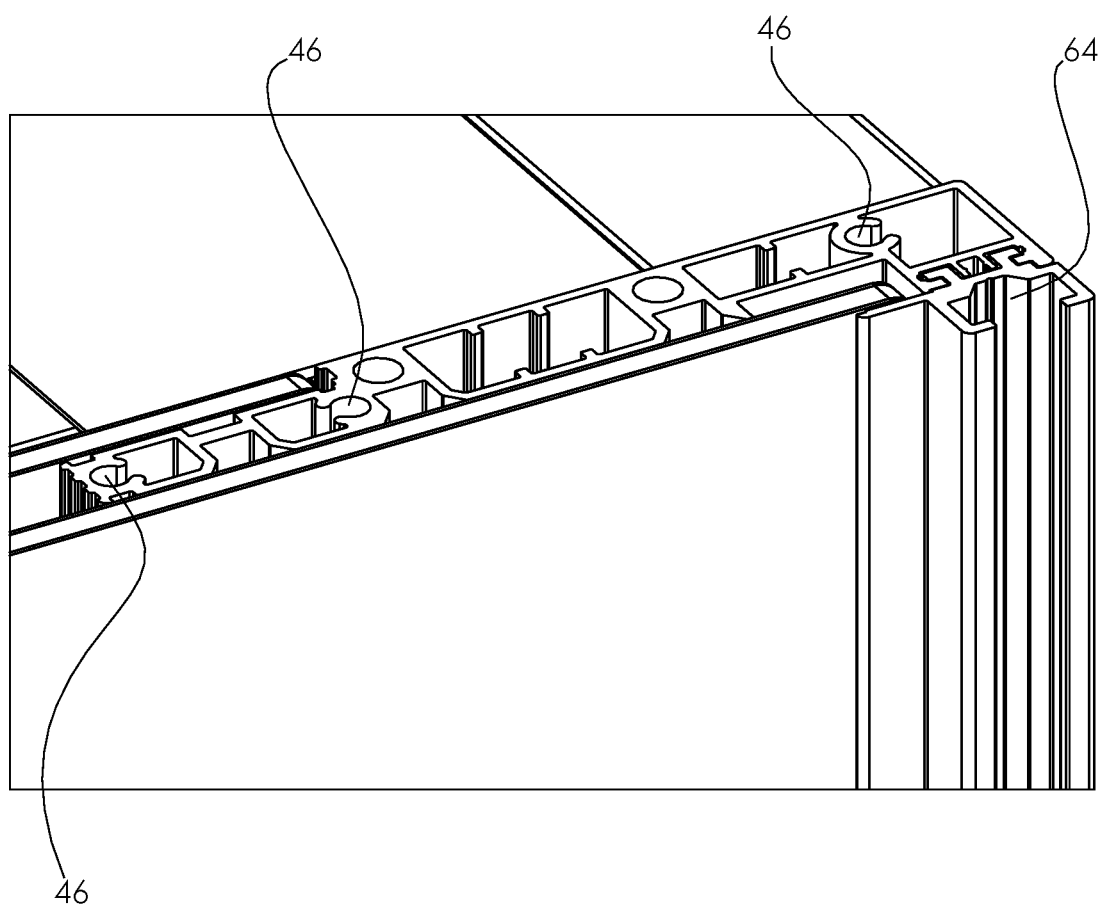
FIG. 16 is a perspective side view of a carcass corner with a hanger channel.

Looking at FIGS. 15 and 16 a hanger strip 118 is engaged in a first zipper channel 64. Here there is a "C" shaped channel 120 for the attachment of display bars, handles, pulls etc., added to a trim strip. This allows the attachment to be made onto a cabinet with an exterior panel.

While disclosed made of extruded aluminum, it is known that other materials of construction may be utilized such as polymers, steels, brass alloys, carbon fibre, fiberglass, glass/polymer mixtures and the equivalent.

While certain features and aspects have been described with respect to exemplary embodiments, one skilled in the art will recognize that numerous modifications are possible. While certain functionality is ascribed to certain system components, unless the context dictates otherwise, this functionality can be distributed among various other system components in accordance with the several embodiments.

Figure 18:
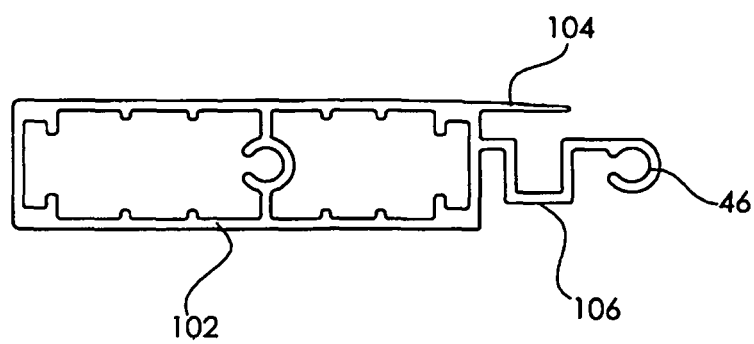
FIG. 18 is a cross sectional view of a first alternate embodiment horizontal member.
Figure 19:
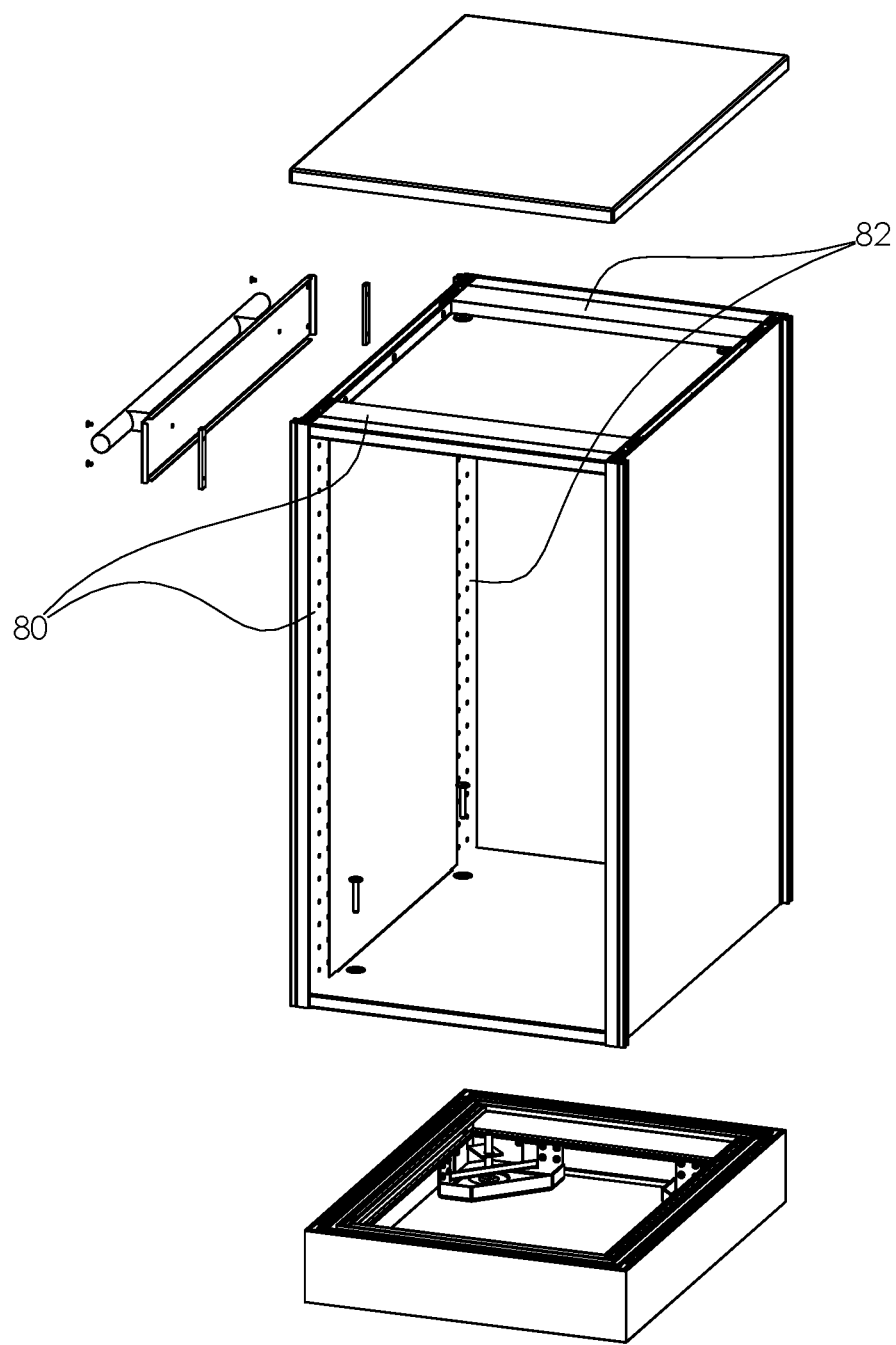
FIG. 19 is cross sectional view of a second alternate embodiment horizontal member.

System components described according to a particular structural architecture and/or with respect to one system may be organized in alternative structural architectures and/or incorporated within other described systems. For example, FIGS. 18 and 19 show a first alternate embodiment horizontal member 101 and second alternate embodiment horizontal member 102. These also embody an aluminum extrusion linear member with at least one "C" shaped screw buss 46 and at least two parallel and linear voids formed therein. They differ from the vertical member 20 in that they each incorporate a panel lip with a ¼ inch spacing from the screw buss to accommodate the retention of a top or bottom panel. It is notable that here that one of the screw busses 46 in each of these embodiments reside outside of the enclosed extrusion, suspended from an arm 106 extending normally from a distal end of the member.

Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise.

While there is a multitude of articles of furniture that may be made, the novelty lies in the simplistic fabrication methodology that results in high quality furniture based on joinable vertical and horizontal members with exposed zipper channels. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A frame for the construction of a box carcass, comprising:
   a first and a second identical vertical linear member, each having a first distal end, a first proximal end, an inner side, an exterior side, and a first linear axis;
   a first exterior open channel formed along said first and second vertical linear members, said first exterior open channel having a first linear centerline with a first patterned series of first orifices formed there along;
   a second exterior open channel formed along said first and second vertical linear members, said second exterior open channel having a second linear centerline with a second patterned series of second orifices formed there along;
   a third exterior open channel formed along said first and second vertical linear members, and said third exterior open channel having a third linear centerline with a third patterned series of third orifices formed there along and wherein said first, second and third exterior open channels each reside parallel to said first linear axis;
   a first and second identical horizontal linear member, each having an exterior face, an interior face, a second proximal end, a second distal end and a second linear axis, and a first screw buss and a second screw buss formed there along and therein parallel to said second linear axis;
   a plurality of mechanical fasteners;
   wherein said first distal end and said first proximal end of said first vertical linear member each perpendicularly abut said second distal end of said first and second horizontal linear members and a first of said plurality of mechanical fasteners is mechanically engaged between one of said first orifices and said first screw buss and a second of said plurality of mechanical fasteners is mechanically engaged between one of said third orifices and said second screw buss to connect said first vertical linear member to said distal end of said first and second horizontal linear members; and
   wherein said first distal end and said first proximal end of said second vertical linear member each perpendicularly abut said second proximal end of one of said first and second horizontal linear members and a third of said plurality of mechanical fasteners is mechanically engaged between one of said first orifices and said first screw buss and a fourth of said plurality of mechanical fasteners is mechanically engaged between one of said third orifices and said second screw buss to connect said second vertical linear member to said proximal ends of said first and second horizontal linear members
   a first zipper channel formed along an entire edge of said exterior side of said each vertical linear member, said zipper channel having two "L" shaped dados formed there along.

2. The frame for the construction of a box carcass, of claim 1 wherein said first patterned series of first orifices, said second patterned series of second orifices and said third patterned series of third orifices are horizontally aligned and have a common spacing between all adjacent orifices in their series of 32 mm.

3. The frame for the construction of a box carcass, of claim 1 further comprising a rectangular panel.

4. The frame for the construction of a box carcass, of claim 1 further comprising a first linear rabbet formed along an entire edge of said inner side of said first and second vertical linear members.

5. The frame for the construction of a box carcass, of claim 4 further comprising a second linear rabbet formed along an entire edge of said exterior face of said first and second horizontal linear member.

6. The frame for the construction of a box carcass, of claim 1 further comprising a second zipper channel formed along an entire distal end of said first and second vertical linear member, said zipper channel having two "L" shaped dados formed there along.

7. The frame for the construction of a box carcass of claim 1 wherein said first open exterior channel, said second open exterior channel and said third open exterior channel are beveled.

8. The frame for the construction of a box carcass of claim 7 further comprising at least one linear void formed therein said first and second vertical linear members; wherein said linear void is parallel to said first linear axis.

9. The frame for the construction of a box carcass of claim 8 wherein said at least one linear void extends from said first distal end to said first proximal end of said first and second vertical linear member, said void residing parallel to said first linear axis.

10. The frame for the construction of a box carcass of claim 9 further comprising a central void extending from said second distal end to said second proximal end of said first and second horizontal linear member, said central void residing parallel to said second linear axis.

11. The frame for the construction of a box carcass of claim 1 wherein said screw busses are "C" shaped, extending from said first distal end to said first proximal end of said first and second horizontal linear members, and having an open slot formed there along said screw buss.

12. The frame for the construction of a box carcass, of claim 1 further comprising a trim strip engaged in said zipper channel, said trim strip having a panel lip extending normally from said zipper channel and residing approximately ¼ inch above an exterior face of said first and second linear members, adapted to constrain an edge of an aesthetic panel between said first and second vertical linear member and said trim strip.

\* \* \* \* \*